Patented Aug. 9, 1938

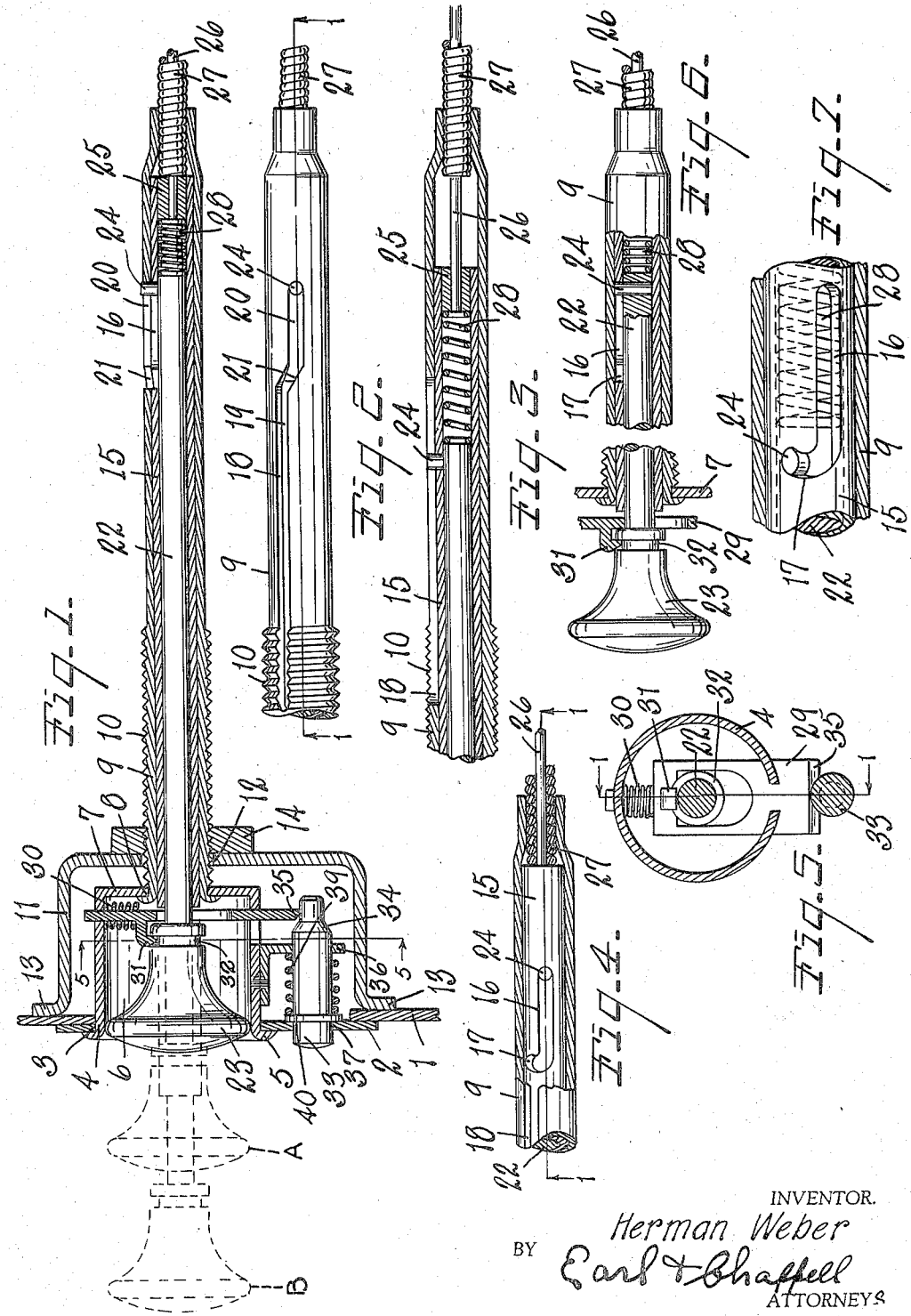

2,126,234

UNITED STATES PATENT OFFICE 2,126,234

REMOTE CONTROL DEVICE

Herman Weber, Kalamazoo, Mich., assignor to Shakespeare Products Company, Kalamazoo, Mich.

Application August 9, 1937, Serial No. 158,165

9 Claims. (Cl. 74—502)

The main objects of this invention are:

First, to provide a remote control device adapted for mounting on the instrument board or panel of a motor vehicle, airplane, or in other relations as desired in which there are normally no projecting parts which would be likely to injure a person thrown against the instrument board or panel or to catch upon clothing or the like.

Second, to provide an assembly of the type described which is automatically latched or secured in retracted position when it is returned to such position.

Third, to provide a device having these advantages which is simple and economical in structure and very easily manipulated.

Objects relating to details and economies of the invention will appear from the description to follow. The invention is defined and pointed out in the claims.

Preferred embodiments of the invention are illustrated in the accompanying drawing, in which:

Fig. 1 is a fragmentary view partially in longitudinal section on line 1—1 of Figs. 2, 4, and 5 of a remote control device embodying the features of the invention, the parts being shown in retracted position by full lines and in position for use and also in actuated position by dotted lines.

Fig. 2 is a fragmentary side view showing details of the support and associated parts.

Fig. 3 is a fragmentary view mainly in longitudinal section illustrating the position of the parts when the actuating plunger is unlatched.

Fig. 4 is a fragmentary view similar to Fig. 2 with parts being sectioned and broken away to show further structural details.

Fig. 5 is a fragmentary transverse section on line 5—5 of Fig. 1.

Fig. 6 is a fragmentary view partially in longitudinal section of a modified form or embodiment of my invention.

Fig. 7 is an enlarged fragmentary view partially in section illustrating further details of the embodiment of my invention shown in Fig. 6.

The present invention relates to remote control devices and is especially designed for use on motor vehicles, airplanes, and the like and to be mounted on the instrument board or panel thereof although it is adaptable and desirable for use in any field where remote controls of the general type are suitable.

In remote control devices as commonly used, the hand piece or knob-like grip commonly employed projects from the panel or instrument board and this has constituted a source of danger in automobile accidents and projects to catch upon clothing or other objects. It is therefore desirable to provide a control device which while capable of ready manipulation is substantially concealed or protected and this I have accomplished by my invention.

In the embodiment of the invention illustrated in the accompanying drawing, 1 represents the instrument board or panel of a motor vehicle, airplane, or other control board. The escutcheon 2 of the control assembly is designed to rest against the instrument panel, the escutcheon being apertured at 3 to receive the cupped housing 4 of the support, the outer end of the housing being spun over the escutcheon at 5 or otherwise secured thereto. This housing provides a forwardly facing recess or chamber 6.

The closed end 7 of the housing is apertured at 8 to receive the tubular support member 9 which is externally threaded at 10. The supporting yoke 11 has a hole 12 in the cross member thereof receiving the support member 9. The ends of the yoke are turned outwardly and abut the inner side of the instrument board or panel 1. The nut 14 threaded on the support 9 against the yoke clamps the parts firmly upon the instrument panel.

Slidably supported within the support is a tubular or sleeve-like actuating member 15 provided with a bayonet slot 16, the curved offset or bay portion 17 of which is disposed forwardly. The support member 9 is longitudinally slotted at 18 to provide a guideway, this slot having parallel angularly offset end portions 19 and 20 connected by an angled portion 21. The portion 20 coincides with the longitudinal portion of the slot 16.

The plunger rod 22 is slidably mounted in the tubular actuting member and has a handle or grip 23 at its forward end. On this plunger rod is a pin or lug 24 adapted to travel in the slot 16 of the actuating member and also to engage the slot or way 18 of the support.

The actuating member 15 is closed at its inner end by means of a plug 25 through which it is secured to the end of the control rod or wire 26. This connecting rod 26 is commonly flexible and is arranged within a flexible housing 27, the end of which is secured to the support. This type of flexible transmission means for remote control devices is well understood by those skilled in the art and I have not therefore illustrated it as being connected to the throttle or other part to be controlled.

A coiled compression spring 28 is arranged within the actuating member to engage the inner end of the plunger rod 22, the plug 25 providing a thrust or supporting member for the spring. This tends to urge the plunger forwardly to grasping position as indicated by dotted lines at A, Fig. 1, the actuated position of the plunger rod being indicated by dotted lines in Fig. 1 at B.

The parts described provide a lost motion connection for the plunger rod to the actuating member and with the embodiment shown in Figs. 1 to 5 inclusive, the parts are automatically actuated to engage the plunger and the actuating member for manual manipulation when the latching means which I will now describe is manually released.

As shown in Figs. 1 and 5, the side walls of the housing portion of the support are oppositely slotted to receive and slidably support the latch 29 which is normally urged to engaging position by the coiled spring 30 surrounding a portion of the latch and supported at its outer end by the housing.

The latch is provided with a keeper engaging portion 31 coacting with an annular groove-like keeper 32 formed in the shank portion of the handle or grip 23. The latch and the handle have surfaces curved so that they are presented to each other when the handle is pushed to collapsed position and the latch automatically engages the keeper. The latch has an elongated opening receiving the plunger so that movement of the latch is permitted. The latch extends downwardly into the path of the camming push button 33 which is provided with a cam surface 34 coacting with a suitable cam surface 35 on the latch.

A push or release button is mounted in a bracket 36 welded to the housing portion 4 of the support and in an aligned opening 37 in the escutcheon. A spring 39 surrounding the release button is disposed between the bracket 36 and an annular collar 40 on the button so that the button is urged yieldingly outward. When the plunger rod is released by manipulation of the push button, the spring 28 urges it forwardly and brings the pin thereof into the offset portion 17 of the slot 16, thereby connecting the plunger rod and the actuating member. This is automatically accomplished in the embodiment shown in Figs. 1 to 5, the inclined portion 21 of the way in the support coacting with the curved end of the slot in the control member, actuating the parts into engagement as stated. The grip is then in the position shown by dotted lines at A in Fig. 1, and the device may be manually manipulated as desired. When manipulations are completed and it is desired, for example, to close the throttle, the plunger is pushed inwardly to collapse the grip within the support housing as shown by full lines in Fig. 1, so that normally there are no projections which are likely to cause injury or with which objects may be engaged.

In the embodiment shown in Figs. 6 and 7, the guideway in the support is omitted and it is then necessary to manually rotate the plunger grip to release the same from the actuating member. It is effectively automatically engaged owing to the shape of the slot in the actuating member. The same latching means may be employed with the modification shown in Figs. 6 and 7 as with that of the embodiment of Figs. 1 to 5.

I have illustrated and described my invention in highly satisfactory embodiments thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent, is:

1. In a control device, the combination of a tubular support member provided with a longitudinal slot having portions thereof angularly offset relative to one another and connected by an angled portion, a housing at the front end of said support member, a tubular actuating member slidable within said support and provided with a bayonet slot disposed with an offset end forwardly, a plunger slidable and rotatable within said actuating member and provided with a pin engaging said slots in said actuating and support members, said pin and bayonet slot providing a lost motion connection between said plunger and said actuating member, a spring arranged in said actuating member and acting to urge said plunger outwardly, a finger piece for said plunger collapsible within said housing, and a latch for retaining said plunger in retracted position.

2. In a control device, the combination of a support provided with a forwardly opening housing, a tubular actuating member slidable within said support and provided with an angled slot disposed with an offset end forwardly, a plunger slidable and rotatable within said actuating member and provided with a pin engaging said slot in said actuating member, said pin and slot providing a lost motion connection between said plunger and said actuating member, a spring arranged in said actuating member and acting to urge said plunger outwardly, and a manually releasable latch for retaining said plunger in retracted position.

3. In a control device, the combination of a support provided with a longitudinal way having angularly offset parallel end portions and an angled intermediate portion, a tubular actuating member slidable within said support and provided with an angled slot disposed with an offset end forwardly, a plunger slidable and rotatable within said actuating member and provided with a pin engaging said slot and way in said actuating member and support respectively, said pin and slot providing a lost motion connection between said plunger and actuating member, and means for projecting said plunger to automatically engage it with said actuating member.

4. In a control device, the combination of a slidably supported actuating member, a manually actuatable member slidable and rotatable within said actuating member, one of said members being provided with a slot having an offset portion, the other member being provided with a pin engageable in said slot, said pin and slot providing a lost motion connection for said manually actuatable member and actuating member, said members being connected for operative movement when said pin engages in said offset portion, and means for automatically engaging said pin in the offset portion.

5. A control device of the class described comprising a tubular actuating member, a plunger slidable therein and having a lost motion connection therewith comprising a lug on the plunger engaged in a slot in the actuating member and engageable for operation of the actuating member in an offset portion of the slot, means for automatically rotating the plunger to bring said lug into operative position in said offset portion comprising a tubular support slidably receiving said actuating member and having a way receiving and guiding said lug and comprising parallel portions connected by an angular portion, and means acting to yieldingly urge said plunger to actuating member engaging position.

6. A control device of the class described comprising a tubular actuating member, a plunger slidable therein and having a lost motion connection therewith comprising a lug on the plunger engaged in a slot in the actuating member and engageable for operation of the actuating member in an offset portion of the slot, and means for automatically rotating the plunger to bring said lug into operative position in said offset portion.

7. In a control device, the combination of a support, an actuating member slidable on said support, a plunger rod slidably associated with said actuating member and having a lost motion connection therewith, said plunger being provided with a finger-piece housed within said support when the plunger is retracted, means for projecting said plunger and automatically engaging it with said actuating member whereby the actuating member may be actuated from said finger-piece, an automatically engaging latch for retaining said plunger in retracted position, and manually actuated means for releasing said latch.

8. In a control device, the combination of a support, an actuating member slidable on said support, a plunger rod slidably associated with said actuating member and having a lost motion connection therewith, said plunger being provided with a finger-piece housed within said support when the plunger is retracted, means for projecting said plunger for grasping, and manually releasable means for retaining said plunger in retracted position.

9. A control device comprising a slidably supported actuating member, a manually actuated plunger slidably associated with said actuating member and having a lost motion connection therewith, means for projecting said plunger and engaging it with said actuating member whereby the actuating member may be actuated from said plunger, and an automatically engaging manually releasable latch for retaining said plunger in retracted position.

HERMAN WEBER.